(No Model.) 2 Sheets—Sheet 1.
D. P. WEIR.
VALVE.

No. 348,303. Patented Aug. 31, 1886.

Witnesses
C. H. Raeder.
Wm Turner

Inventor
Daniel P Weir
By his Attorney J. J. W. Robertson

N. PETERS, Photo-Lithographer, Washington, D. C.

(No Model.) 2 Sheets—Sheet 2.
D. P. WEIR.
VALVE.

No. 348,303. Patented Aug. 31, 1886.

Witnesses
C. H. Raeder
Jno. Turner

Inventor
Daniel P Weir
By his Attorney J. J. W. Robertson

UNITED STATES PATENT OFFICE.

DANIEL P. WEIR, OF SALEM, MASSACHUSETTS.

VALVE.

SPECIFICATION forming part of Letters Patent No. 348,303, dated August 31, 1886.

Application filed April 19, 1886. Serial No. 199,387. (No model.)

*To all whom it may concern:*

Be it known that I, DANIEL P. WEIR, a citizen of the United States, residing at Salem, in the county of Essex and State of Massachusetts, have invented certain new and useful Improvements in Valves, of which the following is a specification, reference being had therein to the accompanying drawings, in which—

Figure 1:
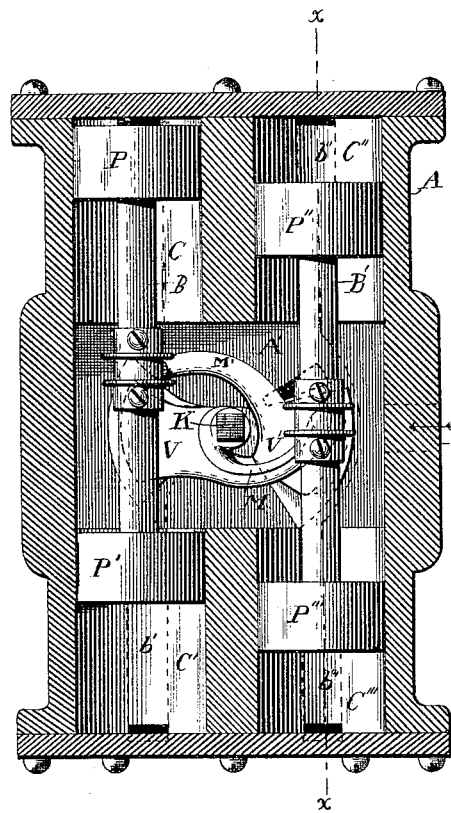
Figure 2:
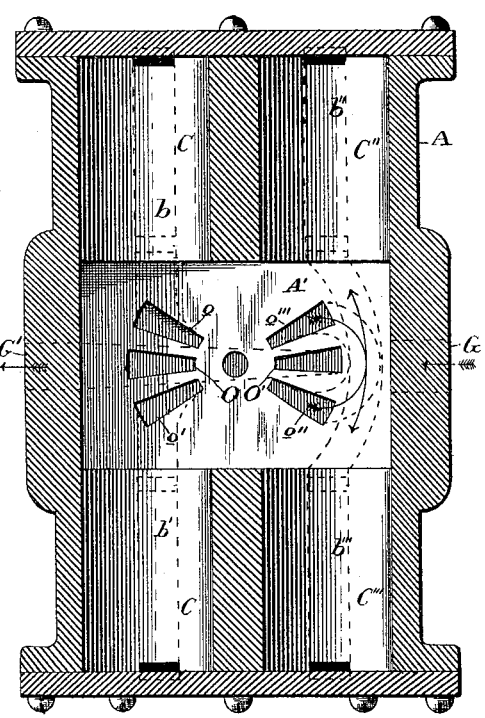
Figure 3:
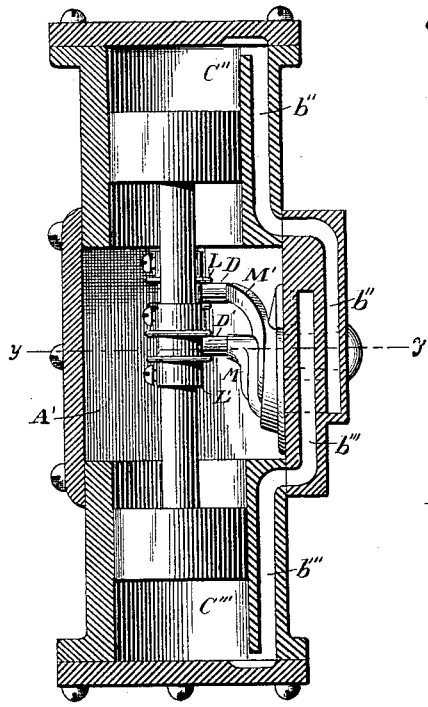
Figure 4:
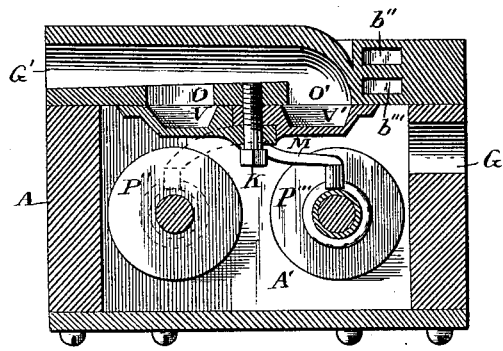
Figure 5:
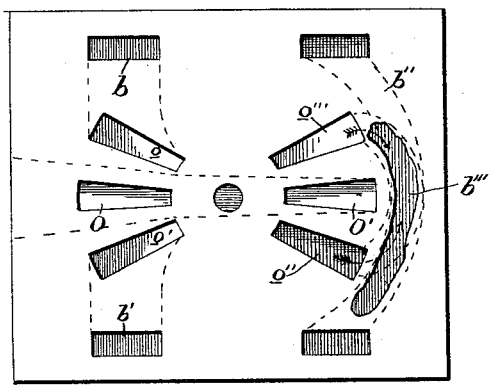

Figure 1 represents a longitudinal central section; Fig. 2, a similar section of the case with pistons and valves removed to more clearly show the passages. Fig. 3 is a longitudinal section at right angles to that shown in Fig. 1, and taken through the line $x\ x$ of Fig. 1. Fig. 4 is a transverse section through the line $y\ y$ of Fig. 3, and Fig. 5 is a detail, on a larger scale, of the valve-seat plate with part broken away to show the passages better.

This improvement relates to valves of that class shown in my Patents Nos. 234,898 and 338,572, issued, respectively, November 30, 1880, and March 23, 1886; and the invention consists in the peculiar construction, combination, and arrangement of parts hereinafter more particularly described, and then pointed out in the claims.

The valves I have shown as attached to and worked by the pistons of a water-meter, such as is shown in my Patent No. 234,898, before referred to; but it is evident that it may be used for other purposes—such as for water-motors like that shown in my Patent No. 338,572, or for steam engines or pumps.

As the cylinders, the pistons, their rods, and the collars attached to them are substantially the same as those shown in my aforesaid Patent No. 234,898, it is unnecessary to go into a detailed description of them, and I will therefore dwell more particularly on the construction and arrangement of the valves and passages.

Referring now to the details of the drawings, A represents the casing containing the cylinders and pistons, having secured to the back of the same a plate forming the valve-seat A', provided with certain ports and passages, which will be more fully described hereinafter. In the center of this plate is a threaded hole which receives a bolt or stud, K, on which oscillates both of the quadrant-valves V V', which move to cover and uncover the ports in essentially the same way as in my before-mentioned patents, although differing in the connection with the operating devices and the position of the bearings on which they oscillate.

The inlet-port for the fluid or steam is preferably made in the casing at G. The exhaust-ports are shown at O O', and are clearly shown in Fig. 2. They both communicate with the passage G', formed in the back of the valve-plate. On both sides of each of these outlet-ports and of the same size and shape, and being very nearly equal sectors of the same circle, and separated from the outlet-ports by other equal sectors of the same circle, are what may be called the "cylinder-ports" $o\ o'$, and $o''\ o'''$ being openings in the back of the valve-chamber, through which the fluid may pass to the passages $b\ b'$ and $b''\ b'''$, which extend from the cylinder-ports through the casing to the extreme ends of the cylinders, as shown by the dotted lines, each port being thus connected by a distinct passage to the space at the outer end of a cylinder. The valves which open and close these ports are each quadrant oscillating valves, vibrating on the bolt or stud K, set in the center of the ports, and are moved by the arms M M', operated by the grooved collars L L' and pins D D' formed on or attached to the arms M M'. The valve V', for the right-hand ports, is moved by the left-hand piston-rod, and the valve V, for the left-hand ports, is moved by the right-hand piston-rod. The arms by which the valves are moved are attached near the pivotal center and are operated as levers of the first power, having the bolt or stud K for a fulcrum. This arrangement allows of both valves having exactly the same motion and oscillating on the same center, and saves space in the valve-chamber. A portion of each valve is raised, making a box or shell with the under side open, having a flat flange working water-tight. These valves shut at all times the direct passage of water from the valve-chamber to the outlet-ports O O', but permit, as they vibrate, the alternate flow from the valve-chamber through the cylinder-ports $o\ o'$ and $o''\ o'''$ to the ducts $b\ b'$ and $b''\ b'''$, and through them to the cylinders; thence, after acting upon the pistons, returning by the same ducts and through the valve-shell, which would then be in position to receive the flow. The fluid passes through the middle port, O O', to the outlet G'.

It will be observed that the port $o'''$ opens into a passage, $b'''$, which leads into the cylinder C''', (see Figs. 2, 3, and 5,) and that the port $o''$ communicates with a passage, $b''$, which passes underneath the passage $b'''$, and leads to the cylinder C''. This arrangement of the ports and passages enables me to oscillate the valves on a single bolt, as shown.

The piston-rods may operate the indicating mechanism of a meter by means shown in my patent before referred to, or they may be connected to the piston of a steam-engine and used as a steam-pump; but as these features form no part of my present invention they are not illustrated.

In operation, the arrangement of the parts is such that when one pair of the pistons is about to stop the other pair is moving with the most power and motion. Fig. 1 shows the pistons in such a position. The left-hand pair of pistons is at the highest point and the right-hand pair is then at the middle of its stroke. The left valve, V, being operated by its arm M from the right piston-rod, B', by the means of the pin D', working in the grooved collar L', is in a position half-way between the opening of the cylinder-port $o'$ to the inlet or valve chamber and the closing of the cylinder-port $o'$, both ports being for an instant shut off from outlet and inlet. While the pistons P P' are thus nearly at rest the valve V is being rapidly changed by the quick motion of the other piston-rod, B'. The piston-rod being at its highest point, the valve V is also raised by the arm M', pin D, and collar L, and the cylinder-port $o'''$ is full open to the inlet-chamber, the water passing through passage $b'''$ to the bottom of cylinder C''' and forcing upward the piston P'''. The cylinder-port $o''$ is at the same moment covered by the valve V', giving the fullest outlet from the cylinder C'' above through the passage $b''$, port $o''$, and outlet-port O' to the common outlet G'.

What I claim as new is—

1. The combination, with four pistons and their rods, the cylinders in which said pistons work, provided with suitable inlet and outlet passages, of two oscillating valves moving independent of each other and mounted on the same center, substantially as described.

2. The combination, with four pistons and their rods, the cylinders in which said pistons work, provided with suitable inlet and outlet passages, of two independently-oscillating quadrant-valves, each having its fulcrum on which it oscillates set between its own ports and those of the other valve, and each carrying a lever that extends toward the piston-rod of the opposite cylinder, substantially as described.

3. The combination, in an engine, and with the cylinders and pistons thereof, of a valve-chamber having a suitable inlet-passage, two exhaust-ports, and two pairs of induction-ports, each pair being arranged substantially between the ends of the cylinders to which they lead, and one pair opening into passages on opposite sides of one of the exhaust-ports, and each one of said pair leading to the end of a cylinder on the opposite side of the exhaust-port from which it started, with a pair of valves, both working in the same valve-chest, and each operated by the motion of the piston farthest from it, substantially as described.

4. The combination of two pairs of cylinders, each pair opening from a central valve-chamber provided with a suitable inlet, two pairs of fixedly coupled pistons, two exhaust-ports, and two pairs of induction-ports, each pair being arranged substantially between the ends of the cylinders to which they lead, and one pair opening into passages on opposite sides of one of the exhaust-ports, and each one of the said pair leading to the end of a cylinder on the opposite side of the exhaust-port from which it started, with a pair of valves, both working in the same valve-chest, and each operated by the motion of the piston farthest from it, substantially as described.

5. The combination of four cylinders, their pistons and rods for the same carrying grooved collars, a valve-chamber between said cylinders provided with a suitable inlet-passage, two exhaust-ports, four induction-ports with two valves, each having its fulcrum arranged between the two exhaust-ports and carrying a lever that extends past said fulcrum and connects with a collar on one of the piston-rods, substantially as described.

6. The combination, in an engine, and provided with suitable inlet and outlet passages and with the cylinders and pistons thereof, of two independently-oscillating valves, both mounted on the same center, and connections, as the rods B B', between the pistons and the valves, substantially as described.

7. The combination, in an engine provided with suitable inlet and outlet passages and with the cylinders and pistons thereof, of two independently-oscillating valves, each having its fulcrum on which it oscillates set between its own ports and those of the other valve, and each carrying a lever that extends over the other valve, and suitable connections, as the rods B B', for operating the valves, substantially as described.

In testimony whereof I affix my signature, in presence of two witnesses, this 13th day of April, 1886.

DANIEL P. WEIR.

Witnesses:
CHAS. G. CUSHMAN,
ELLEN HANNAN.